(12) United States Patent
Vijayakumar et al.

(10) Patent No.: US 12,307,063 B2
(45) Date of Patent: May 20, 2025

(54) INDICATING USER INTERACTIONS ASSOCIATED WITH A DOCUMENT

(71) Applicant: Slack Technologies, LLC, San Francisco, CA (US)

(72) Inventors: Manju Vijayakumar, San Francisco, CA (US); Andrew Fong, Menlo Park, CA (US); Michael Hahn, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 554 days.

(21) Appl. No.: 17/566,312

(22) Filed: Dec. 30, 2021

(65) Prior Publication Data

US 2023/0214510 A1 Jul. 6, 2023

(51) Int. Cl.
*G06F 3/0481* (2022.01)
*H04L 51/043* (2022.01)

(52) U.S. Cl.
CPC .......... *G06F 3/0481* (2013.01); *H04L 51/043* (2013.01); *G06F 2221/2141* (2013.01); *G06F 2221/2147* (2013.01)

(58) Field of Classification Search
CPC ........... G06F 3/0481; G06F 2221/2141; G06F 2221/2147; G06F 21/6209; H04L 51/043
See application file for complete search history.

(56) References Cited

U.S. PATENT DOCUMENTS

| | | | |
|---|---|---|---|
| 11,412,011 B1* | 8/2022 | Benjamin | H04L 67/02 |
| 2009/0307604 A1* | 12/2009 | Giles | G06Q 10/10 |
| | | | 715/751 |
| 2011/0252339 A1* | 10/2011 | Lemonik | G06F 40/197 |
| | | | 715/753 |
| 2014/0115059 A1* | 4/2014 | Van Wie | H04L 12/1813 |
| | | | 709/204 |
| 2018/0287982 A1 | 10/2018 | Draeger et al. | |
| 2022/0400138 A1* | 12/2022 | Walling | G06F 3/0484 |

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Hope C Sheffield
(74) *Attorney, Agent, or Firm* — Lee & Hayes, P.C.

(57) ABSTRACT

In association with a communication platform, one or more users can create, share, edit, and/or comment on a document. An indicator can be provided to one user that another user is presently interacting with the document. For example, the indicator can indicate information about a respective user, such as a permission level, virtual-space membership, and the manner in which the user is interacting with the document. In addition, the indicator may provide options to change or update information associated with a respective user, such as by inviting the user to join a virtual space of the communication platform and associated with the document or by changing permissions of the user with respect to the document.

20 Claims, 4 Drawing Sheets

(56) References Cited

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

INDICATING USER INTERACTIONS ASSOCIATED WITH A DOCUMENT

TECHNICAL FIELD

A communication platform can leverage a network-based computing system to enable users to exchange data. In an example, users of the communication platform can communicate with other users via channels, direct messages, and/or other virtual spaces. A channel, direct message, and/or other virtual space can be a data route used for exchanging data between and among systems and devices associated with the communication platform. For example, a channel may be established between and among various user computing devices (e.g., clients), allowing the user computing devices to communicate and share data between and among each other over one or more networks. That is, in some examples, the communication platform can be a channel-based platform and/or hub for facilitating communication between and among users. In some examples, data associated with a channel, a direct message, and/or other virtual space can be presented via a user interface. The data can include message objects, such as text, file attachments, emojis, and/or the like that are each posted by individual users of the communication platform. In addition, the data can include documents (e.g., collaborative documents) that may be shared and edited by one or more users.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
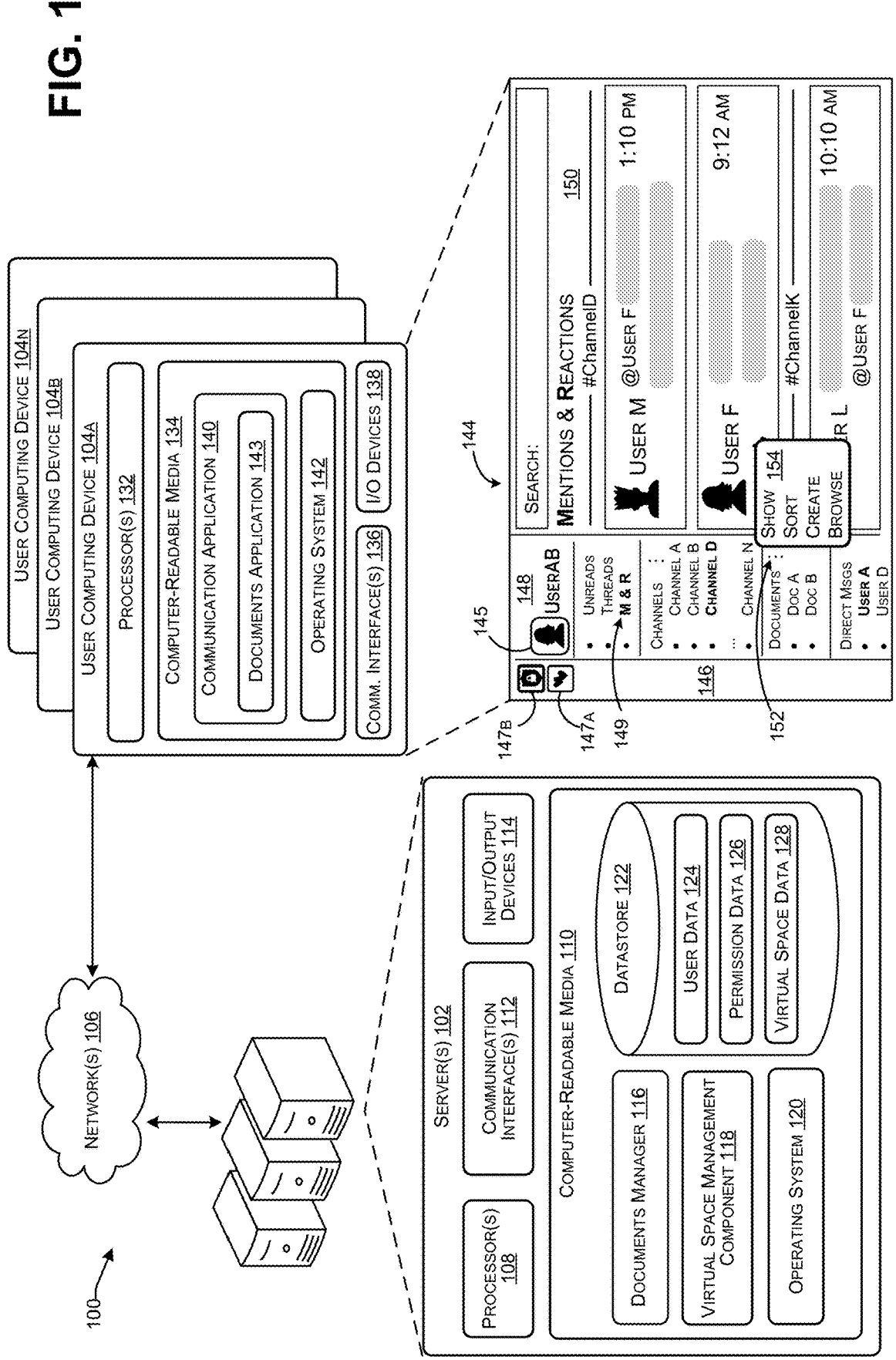
FIG. 1 illustrates an example environment for performing techniques described herein.

As described above, in association with a communication platform, one or more users can create, share, edit, and/or comment on a document. Some examples of this disclosure are related to providing an indication (e.g., by way of an icon or other user interface element) of one or more users (e.g., user accounts) that are presently interacting with the document (e.g., viewing, editing, etc.). For example, a first instance of the document may be presently open on a first user computing device of a first user, and a second instance of the document may be presently open on a second user computing device of a second user. As such, examples of this disclosure can present, in association with the various instances of the document and on each of the user computing device, one or more presence indicators that indicate that the first and second users are presently interacting with the document. In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document), and the manner in which the user is interacting with the document (e.g., currently editing, viewing, open but not active, etc.). In addition, in some examples, a presence indicator may have attributes that are different from other types of user interface elements (e.g., other concurrently presented indicators) that may also convey status information about a user, which can help to more clearly differentiate between user-status information associated with the presence indicator and user-status information associated with a different indicator. Among other things, the presence indicator described in examples of this disclosure can improve collaboration (e.g., via simultaneous interaction) when multiple users are interacting with respective instances of the same document. For example, a user can more quickly determine who else is already interacting with the document without needing to send separate messages and/or can more quickly determine whether to send the document, or a link to the document, to another user (e.g., based on a lack of presence indicator). In addition, the presence indicators can provide an indication of the present status of the document without a user needing to separately message other users to determine a status (e.g., many presence indicators indicating multiple users can suggest the document is being presently viewed and/or edited).

In examples of the present disclosure, a document can be created using tools associated with the communication platform. As used herein, a document can include a collaborative document configured to be accessed and/or edited by two or more users with appropriate permissions (e.g., viewing permissions, editing permissions, etc.). In some examples, the document can be a virtual space, a board, a canvas, a page, or the like for collaborative communication and/or data organization within the communication platform. In at least one example, a collaborative document can support editable text and/or objects that can be ordered, added, deleted, modified, and the like. The document may support various elements, such as, but not limited to, text, symbols, emojis, images, videos, audio, charts, tables, lists, calendar items, spreadsheets, drawings, etc.

In at least one example, a document can be accessible (e.g., with various types of permissions) to multiple users (e.g., multiple user accounts). For example, in some instances the document may be accessible by one or more users via a link to the document. That is, when a document is created, a link pointing to the document (e.g., on a server or other storage medium) may also be created, and as such, one or more users may access the document (e.g., the same document) by way of the link. In at least some examples, the document can be associated with an individual (e.g., private document for a user), a group of users (e.g., collaborative document), and/or one or more virtual spaces (e.g., members of the virtual space rendered access permissions to the document). In some examples, a collaborative document can be associated with permissions defining which users of a communication platform can view and/or edit the document. In some examples, a collaborative document can be associated with a communication channel, and permissions may be based on channel membership, such that members of the communication channel can view and/or edit the document. In some examples, a collaborative document can be sharable (e.g., via a link or other address indication), such that data associated with the document is accessible to and/or interactable for members of the multiple communication channels, workspaces, organizations, and/or the like. For example, in some instances a document can be associated with a user, channel, or other virtual space and can be shared with users that are not members by sharing a link to the document.

In some examples, a user can interact with a document via a user interface (e.g., window, pane, or other region associated with a user interface) associated with the communication platform. For example, the user may be able to view the document and, if permissions allow, to edit the document, share the document, comment on the document, etc. Often, when a user is interacting with a document, the user may benefit from updates indicating whether other users are also interacting the document at the same time (e.g., interacting with a respective instance of the document on a separate user computing device). For example, in a collaborative context, a user may want to be able to quickly determine which other users are currently interacting with the document. In addition, a user may want to be able to quickly determine when a document is being viewed and/or edited. As such, examples of the present disclosure include presenting, in association with the document, a presence indicator that indicates to a user when another user is interacting with the document. In addition, examples of the present disclosure include presenting a respective presence indicator associated with any of the users (e.g., all of the users) presently interacting with the document.

A presence indicator can include various elements. For example, a presence indicator may include a graphical element presented at a position associated with the document, such as near a header or footer or other margin. The presence indicator may include an identifier associated with the respective user whose presence is indicated. For example, the identifier may include a profile image, text, symbol, or other profile identifier associated with the respective user. In addition, the presence indicator may indicate a manner in which the respective user is interacting with the document. For example, the presence indicator may include a first type of element to indicate that a respective user is viewing a document, a second type of element to indicate that the respective user is editing the document, or a third type of element to indicate some other manner of interaction. In some examples, rendering of the presence indicator associated with the respective user may be conditioned on an interaction of the respective user satisfying a condition. For example, a condition may include the document being open in a particular window, pane, or other area of a user interface of the respective user's computing device (e.g., open in a foreground window and not in a background window). Another example of a condition may include receiving some input (e.g., any input) from the respective user within a threshold time or expiration of a time (e.g., inferring the given user is currently active in the user interface based on having recently provided some input). Another example of a condition may include a level of activity meeting or exceeding a threshold level of activity (e.g., viewing or editing a document above a threshold amount of time or amount of content changes, etc.).

In some examples, the presence indicator may include an element indicating a permission level associated with the respective user. For example, a first type of element may indicate that a respective user has only viewing permission, a second type of element may indicate that the respective user has permission to edit, and a third type of element may indicate some other permission associated with the respective user. In at least some examples, the presence indicator may include an element indicating whether the respective user is a member of a virtual space associated with the document. For example, if the respective user is a member of the virtual space (e.g., channel) associated with the document, then the presence indicator may include a first presentation, and if the respective user is not a member of the virtual space associated with the document, then the presence indicator may include a second presentation, which is different from the first presentation. In some examples, such as when the respective user is not a member of the virtual space, interacting with the presence indicator may trigger an affordance (e.g., a graphical element or other indication) that, when selected, invites the respective user to join the virtual space.

In at least some examples, a user interface in which a presence indicator is rendered may include one or more other user status indicators and/or user profile indicators that are associated with one or more users. As such, examples of the present disclosure may include the presence indicators having a different appearance, so as to quickly distinguish from other types of user indicators. For example, presence indicators may include a first attribute (e.g., shape, color, size, motion, animation, etc.), whereas other user indicators may include a second attribute that is different from the first attribute.

While techniques described herein are described with reference to documents, techniques can be similarly applicable to any other object for which a user can be virtually present. For example, presence indicators, such as those described herein, may be rendered in association with virtual spaces, including channels, direct messages, huddles, other collaborative mediums, and the like. Additional details are described below.

Examples of this disclosure can streamline document review, editing, sharing, and collaborating. For example, if a first user can determine, by way of a presence indicator, that a second user is already interacting with a document, then the first user need not use resources and time to share the document with the second user. Further, since the first user may not send to the second user a message including a link to the document, the second user will not receive, and have to process, unnecessary messages (e.g., unnecessary because the second user is already in the document). In additional examples, a first user that is interacting a document can quickly determine, based on the presence indicator(s), a document status (e.g., whether the document has been viewed, edited, etc.). That is, absent the present disclosure, the first user may not be able to quickly determine whether a document has been viewed or edited or to quickly determine the nature and amount of interaction presently occurring with respect to the document. With examples described herein, the first user can quickly assess, based on the presence indicator(s), activities associated with the document without needing to message one or more other users.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied or implemented in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users (e.g., user accounts) of the communication platform to exchange data. In at least one example, the communication platform can be "group-based" such that the platform, and associated systems, channels, message objects, documents, and/or virtual spaces, have security (that can be defined by permissions) to limit access to defined groups of users, such a defined group of users having, for instance, sole access to a given channel, message object, document, and/or virtual space. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message objects, or otherwise communicate between or among each other, within secure and private virtual spaces, such as channel(s), direct message(s), board(s), and/or the like.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, an organization can be associated with multiple workspaces or a workspace can be associated with multiple organizations.

In at least one example, the server(s) 102 can communicate with one or more user computing devices 104*a*, 104*b*, and/or 104*n* (may also be referred to herein as user computing device(s) 104) via one or more network(s) 106. That is, the server(s) 102 and the user computing device(s) 104 can transmit, receive, and/or store data (e.g., content, message objects, data, or the like) using the network(s) 106, as described herein. In some examples, the user computing device(s) 104 can comprise a "client" associated with a user. The user computing device(s) 104 can be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. In practice, the example environment 100 can include one user computing device or multiple (e.g., tens of, hundreds of, thousands of, millions of) user computing devices. In at least one example, user computing device(s) 104 can be operable by users to, among other things, access communication services via the communication platform. A user can be an individual, a group of individuals, an employer, an enterprise, an organization, or the like. In some examples, users can be associated with designated roles (e.g., based at least in part on an organization chart) and/or types (e.g., administrator, verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, message objects, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a documents manager 116, a virtual space (VS) management component 118, an operating system 120, and a datastore 122.

In examples of the present disclosure, the documents manager 116 facilitates storage (e.g., in the datastore 122) of documents (and information associated with documents) created and edited by the user computing device(s) 104. Examples of documents may include a collaborative document configured to be accessed and/or edited by the user computing device(s) 104. In some examples, the document can be a virtual space, a board, a canvas, a page, or the like for collaborative communication and/or data organization within the communication platform. In at least one example, a collaborative document can support editable text and/or objects that can be ordered, added, deleted, modified, and the like. The document may support various elements, such as, but not limited to, text, symbols, emojis, comments, images, videos, charts, tables, lists, calendar items, spreadsheets, drawings, etc.

In at least some examples, the documents manager 116 can maintain a master version of a document and can provide access to the master version. For example, a link to the master version may be provided to the user computing device(s) 104, which can download an instance or copy of the master version for viewing, editing, sharing, and the like. In examples, the documents manager 116 can track information associated with the document, such as a log of one or more users that created the document and/or that have received the link to the document (e.g., or otherwise had the document shared). In addition, the documents manager 116 can track permissions associated with the document, such as user-specific permission, virtual-space specific permissions, organizational permissions, and/or any other permissions indicating whether a user (or group of users) can view, edit, share, and/or perform any interaction with respect to the document.

The documents manager 116 can maintain various other information associated with a document. For example, the documents manager 116 can store any associations of the document with one or more users (e.g., users tagged in the doc via "@" or other mentioning techniques) or with one or more virtual spaces (e.g., a channel with which the document is associated). In addition, the documents manager 116 can facilitate collaboration between users (e.g., via the user computing device(s) 104) with respect to a document. That is, multiple users may download a respective instance of a document and simultaneously interact (e.g., via respective document user interfaces) with the document and/or with one another. As such, the documents manager 116 can coordinate simultaneous interactions of multiple users with respect to the document, such as by facilitating viewing across the user computing device(s) and reconciling edits, comments, or other changes with respect to the document.

In examples of the present disclosure, the documents manager 116 can determine user presence information indicating one or more interactions of one or more users with a document. For example, the documents manager 116 can maintain a log tracking an identity associated with any user that is presently interacting (e.g., viewing, editing, etc.) with a document. In some examples, the documents manager 116 may request and/or receive updates related to any such interactions from the user computing device(s), such as whether the user account is viewing or editing a document (e.g., an instance of the document) or whether the document is in a foreground of a user interface. In some examples, the documents manager 116 can determine information associated with any user interacting with a document. For example, the documents manager 116 can determine permissions of the user with respect to the document, whether the user is a member of a virtual space associated with the document.

In at least some examples of the present disclosure, information tracked by the documents manager 116 can be provided to the user computing device(s) 104 to indicate presence information associated with a document, such as which users are presently interacting with the document and any additional information associated with those presently interacting users. For example, the information may be pushed (e.g., via notifications) from the server(s) to the user computing device(s) 104 (e.g., a notification can be pushed when presence information is updated). In some examples, the presence information may be provided in response to a query from the user computing device(s) 104.

In at least one example, the VS management component 118 can manage channels of the communication platform. In at least one example, the communication platform can be "channel-based" such that the platform can be organized into channels having security (that can be defined by permissions) to limit access to defined groups of users (e.g., members of the channels). A channel, or virtual space, can be a data route used for exchanging data between and among systems and devices associated with the communication platform such as, for example, content and/or message objects. In some examples, a channel may be "public," which may allow any user within a group (e.g., associated with an organization identifier, associated with a workspace identifier, etc.) with which the channel is associated to join and participate in the data sharing through the channel. In some examples, a channel may be "private," which may restrict data communications in the channel to certain users or users having particular roles (e.g., managers, administrators, etc.) and/or types (e.g., verified, administrator, etc.). In some examples, a channel may be an "announcement" channel, which may restrict communication in the channel to announcements or may otherwise be associated with announcements instead of other more granular topics of other channels.

In at least one example, a channel can be associated with a defined group of users within the same organization. Such a channel can be an "internal channel" or an "internally shared channel." In some examples, a channel may be "shared" or "externally shared," which may allow users associated with two or more different groups (e.g., entities associated with two or more different organization and/or workspace identifiers) to join and participate in the data sharing through the channel. A shared channel may be public such that it is accessible to any user of groups associated with the shared channel, or may be private such that it is restricted to access by certain users or users having particular roles and/or types. A "shared channel" or an "externally shared channel" can enable two or more organizations, such as a first organization and a second organization to share data, exchange communications, and the like (hence, a "shared" channel or an "externally shared channel" can refer to a channel which is accessible across different organizations, whereas an "internal channel" can refer to a communication channel which is accessible within a same organization). In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared channel can be shared with one or more different workspaces and/or organizations that, without having a shared channel, would not otherwise have access to each other's data by the nature of the permission-based and/or group-based configuration of the communication platform described herein.

In at least one example, the VS management component 118 can receive a request to generate a channel. In some examples, the request can include a name that is to be associated with the channel, one or more users to invite to join the channel, and/or permissions associated with the channel. In at least one example, one or more user identifiers associated with one or more users and/or one or more user accounts can be mapped to, or otherwise associated with, a channel (e.g., a channel identifier associated therewith). User(s) associated with a channel can be "members" of the channel. Members of a channel can communicate with other members via the channel. That is, in at least one example, the VS management component 118 can establish a channel between and among various user computing devices associated with user identifiers associated with the channel, allowing the user computing devices to communicate and share data between and among each other. As described herein, in some examples, such communication and/or sharing of data can be via one or more messages (posted directly by a user or suggested for publication in association with a user account of the user) that can be exchanged via a channel. In at least one example, the VS management component 118 can manage such communications and/or sharing of data. In some examples, data associated with a channel can be presented via a user interface.

As described above, in at least one example, one or more permissions can be mapped to, or otherwise associated with, a channel and/or members associated therewith. Such permission(s) can indicate which user(s) have permission to access the channel, actions, messages and/or other objects associated with the channel, which user(s) and/or type(s) of users are permitted to add or remove members, which user(s) and/or types of users are permitted to share the channel with other users, a retention policy associated with data in the channel, whether the channel is public or private, or the like.

In at least one example, the VS management component 118 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform (e.g., content and/or message objects). In some examples, a direct message can be a private message object between two or more users of the communication platform. In some examples, a direct message can be "shared," which may allow users associated with two or more different groups (e.g., entities associated with two or more different organization and/or workspace identifiers) to join and participate in the data sharing through the direct message.

In at least one example, the VS management component 118 can receive a request to generate a direct message. In some examples, the request can include identifiers associated with one or more users that are intended recipient(s) (e.g., recipient user(s)) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more message objects that can be exchanged via the direct message. In at least one example, the VS management component 118 can manage such communications and/or sharing of data. In some examples, data associated with a direct message can be presented via a user interface.

Additionally, in some examples, the VS management component 118 can be configured to associate a virtual space with a document. That is, a document can be created and shared as part of data shared to members of the virtual space. In some examples, the permissions associated with the virtual space can be attributed to the document as well. For example, if a virtual space is private, then a document associated with the private channel may be discoverable (e.g., via searching and/or a file browser) and may be viewable only by members of the channel. In some examples, if a virtual space is public, then the document may be discoverable and viewable by any member of the organization or workspace with which the virtual space is associated.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, permission data 126, and virtual space (VS) data 128. Additional or alternative data can be stored in the datastore and/or one or more other datastores.

In at least one example, the user data 124 can store data associated with users of the communication platform. In at least one example, the user data 124 can store data in user profiles (which can also be referred to as "user accounts"). In some examples, a user can be associated with a single user profile. In some examples, a user can be associated with multiple user profiles. A user profile can store data associated with a user, including, but not limited to, one or more user identifiers associated with multiple, different organizations, groups, or entities with which the user is associated, one or more group identifiers for groups (or, organizations, teams, entities, or the like) with which the user is associated, one or more channel identifiers associated with channels to which the user has been granted access, an indication whether the user is an owner or manager of any channels, an indication whether the user has any channel restrictions, one or more direct message identifiers associated with direct messages with which the user is associated, one or more document identifiers associated with collaborative and/or personal documents with which the user is associated, a plurality of message objects, a plurality of emojis, a plurality of conversations, a plurality of conversation topics, an avatar, an email address, a real name (e.g., John Doe), a username (e.g., j doe), a password, a time zone, a status, and the like.

In some examples, the user data 124 can store indications of user preferences, which can be explicitly indicated or learned. In some examples, the user data 124 of a user can indicate a role or position of a user, which can be determined based at least in part on an organizational chart and/or learned. In some examples, the communication platform can analyze messaging and/or other interaction data to determine relationships between users and/or relative ranks and can infer organizational charts. In some examples, the user data 124 of a user can indicate a user type of the user, for example, whether the user is an administrator, a verified user, and/or the like. In at least one example, user type can be a designation provided by the communication platform (e.g., wherein roles can be designated by organizations, workspaces, teams, and/or other groups). In some examples, the communication platform can store indications of which users and/or virtual spaces a user communicates with and/or in, a frequency of such communication, topics associated with such communications, reactions and/or feedback associated with such communications and/or the like.

In at least one example, the permission data 126 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the permission data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the permission data 126 can store data associated with permissions of individual channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the channel in the VS data 128. In some examples, permissions can indicate restrictions on individual channels, restrictions on user(s) associated with individual channels, and the like.

In some examples, the permission data 126 can store data associated with permissions of individual message objects, documents, or other objects. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user (e.g., the originator of the message object, document, etc.), or the like. In some examples, permissions associated with a message object, document, or other object can be mapped to, or otherwise associated with, data associated with the message object or other object. In some examples, permissions can indicate viewing permissions, access permissions, editing permissions, etc.

In at least one example, the VS data 128 can store data associated with individual channels, direct messaging instances, communication instances (e.g., associated with collaborative editing sessions), collaborative documents (e.g., documents shared by two or more users), audio and/or video communications, and/or the like. In at least one example, the VS management component 118 can establish a virtual space between and among various user computing devices, allowing the user computing devices to communicate and share data between and among each other. In at least one example, a virtual space identifier can be assigned to a virtual space (e.g., channel, direct message instance, board, collaborative document, audio or video communication, etc.), which indicates the physical address in the VS data 128 where data related to that virtual space is stored. In some examples, individual messages, documents, or other objects posted to a virtual space can be stored in association with the VS data 128. In some examples, a collaborative document may be configured as its own virtual space (e.g., an information container via which users can exchange information in various forms, such as text, symbols, emojis, images, videos, charts, tables, lists, calendar items, spreadsheets, drawings, etc.).

As described above, documents posted, or otherwise sent and/or received, via channels, direct messages, collaborative documents, etc. can be stored in association with the VS data 128. In some examples, such documents can additionally or alternatively be stored in association with the user data 124. In some examples, document data can be stored separately from the user data 124 and the VS data 128. Document data can include various information. For example, document data stored in the datastore 122 can include content of the document, such as text, symbols, emojis, images, videos, charts, tables, lists, calendar items, spreadsheets, drawings, etc.). In addition, document data can include permissions associated with the document, including permissions associated with viewing, sharing, editing, etc. Document data can also include file properties associated with the document. In some examples, document data may include an indication of one or more virtual spaces (e.g., channels) associated with the document. In addition, document data may include presence information indicating one or more users presently interacting with the document. The presence information may identify a user (e.g., user account). In some examples, the presence information may indicate a manner in which the user is presently interacting with the document, such as by presently viewing, editing, having open in a background, etc. In some examples, the presence information may indicate (or be used to determine) various other attributes associated with the user, such as permissions of the user with respect to the document and/or whether the user is a member of a virtual space associated with the document.

The datastore 122 can store additional or alternative types of data, which can include, but is not limited to communication data (e.g., data shared in an ephemeral communication instance between at least two users), interaction data (e.g., data associated with additional or alternative interactions with the communication platform), model(s), etc.

In some examples, the datastore 122 can be partitioned into discrete items of data that can be accessed and managed individually (e.g., data shards). Data shards can simplify many technical tasks, such as data retention, unfurling (e.g., detecting that message object contents include a link, crawling or otherwise accessing the link's metadata, and determining a uniform summary of the metadata), and integration settings. In some examples, data shards can be associated with groups (e.g., organizations, workspaces), channels, direct messages, users, documents (e.g., shared documents), or the like.

In some examples, individual groups can be associated with a database shard within the datastore 122 that stores data related to a particular group identification. For example, a database shard can store electronic communication data associated with members of a particular group, which enables members of that particular group to communicate and exchange data with other members of the same group in real time or near-real time. In this example, the group itself can be the owner of the database shard and has control over where and how the related data is stored and/or accessed. In some examples, a database shard can store data related to two or more groups (e.g., as in a shared channel, such as an externally shared channel).

In some examples, a channel can be associated with a database shard within the datastore 122 that stores data related to a particular channel identification. For example, a database shard can store electronic communication data associated with the channel, which enables members of that particular channel to communicate and exchange data with other members of the same channel in real time or near-real time. In this example, a group or organization can be the owner of the database shard and can control where and how the related data is stored and/or accessed.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored and/or accessed.

In some examples, a document can be associated with a database shard within the datastore 122 that stores data related to a particular document. For example, a database shard may store the document, additional data, edits made to the document, electronic communication data associated with a communication instance corresponding to the document, and presence information, which enables users collaboratively editing a document to communicate and exchange data in real-time or near real-time. In this example, a group or organization (e.g., of the suggesting user or of the recipient user) can be the owner of the database shard and can control where and how the related data is stored and accessed.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored and/or accessed.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web Sockets, Application Programming Interfaces (APIs) (e.g., using API calls), Hyper Text Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device(s) 104, such as the user computing device 102a, can include one or more processors 132, computer-readable media 134, one or more communication interfaces 136, and input/output devices 138. In at least one example, the user computing device(s) 104 can correspond to a "client" of a user. In some examples, the user computing device 104 can be associated with multiple "clients," in which case, each instance of an application or other access point can be its own client. For example, a user can be signed into a first client (e.g., the application 140) and a second client (e.g., a web browser), both of which can be associated with the user computing device 104. In another example, the user can be signed into a first client (e.g., the application 140) and a second client, each of which can be on separate user computing devices.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and can be the same as or different from the processor(s) 108.

The computer-readable media 134 can comprise any of the types of computer-readable media 134 described above with reference to the computer-readable media 110 and can be the same as or different from the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

The communication application 140 may include various functional components, and in at least one example, the application 140 includes a documents application 143. In some examples, the documents application 143 may perform one or more operations enabling a user to perform various document-related functions, such as viewing, editing, and/or commenting on a document, such as via the one or more user interfaces described herein. In some examples, the documents application 143 may exchange information with the documents manager 116. For example, the documents application 143 may provide to the documents manager 116 information indicating a user is interacting with a document (e.g., viewing, editing, commenting, etc.). In some examples, the documents manager 116 may communicate to the documents application 143 presence information indicating any interactions of other users (e.g., users of the user computing device 104b and/or 104n) with a document. In examples, based on the presence information, a user interface (e.g., a documents interface) presented via the user computing device 104a may be updated.

A non-limiting example of a user interface 144 is shown in FIG. 1. The user interface 144 may present information associated with a user account (e.g., "UserAB" as indicated by the user profile indicator 145). As illustrated in FIG. 1, the user interface 144 can present data associated with one or more channels, documents, and/or, in some examples, one or more workspaces. That is, in some examples, the user interface 144 can enable a user to access multiple workspaces. In some examples, the user interface 144 can include a first section 146 (e.g., which can be a portion, pane, or other partitioned unit of the user interface 144) that includes user interface element(s) associated with workspace(s) with which the user (e.g., account of the user) is associated. Two user interface elements are illustrated in FIG. 1, including a first user interface element 147a representing a first workspace and a second user interface element 147b representing a second workspace. As described above, such workspaces can be associated with different domains. In some examples, a user can interact with the first user interface element 147a or the second user interface element 147b to access the corresponding workspace. In some examples, a user can be prompted to provide a credential to authenticate with the corresponding workspace. While two user interface elements 147a and 147b are illustrated, any number of user interface elements can be presented via the first section 146, which can be associated with one or more domains.

In some examples, the user interface 144 may include a second section 148 (e.g., which can be a portion, pane, or other partitioned unit of the user interface 144) that includes user interface element(s) representing data associated with the workspace(s) with which the user (e.g., account of the user) is associated. In some examples, user interface element(s) presented via the second section 148 can represent virtual space(s) with which the user has access via a particular workspace or multiple workspaces. In some examples, the second section 148 may include user interface elements that allow the user to take additional action with respect to virtual spaces. For example, by selecting one of the channel identifiers in the section 148, a user may be able to view (via the user interface 144) contents associated with the selected channel. Similarly, by selecting one of the document identifiers in the section 148, a user may be able to view (e.g., in section 150) contents associated with the selected document. In some examples, the second section 148 may include a menu extension indicator 152 that, when selected, causes a menu 154 to be presented. In addition, the menu 154 may present selectable links that, when selected by a user, facilitates a corresponding function, such as controlling the listing of documents in the second section 148, creating a new document, or browsing documents associated with the selected workspace (e.g., presenting all documents accessible to the user).

In at least one example, the user interface 144 can include the third section 150 (e.g., which can be a portion, pane, or other partitioned unit of the user interface 144) that can be associated with a data feed (or "feed") indicating messages posted to and/or actions taken with respect to one or more channels, documents, and/or other virtual spaces for facilitating communications (e.g., a virtual space associated with direct message communication(s), a virtual space associated with event(s) and/or action(s), etc.) as described herein. In at least one example, data associated with the third section 150 can include (e.g., when "browse" is selected in the menu 154) a listing of documents to which the user has access. In at least one example, data associated with the third section 150 can be associated with the same or different workspaces. That is, in some examples, the third section 150 can present data associated with the same or different workspaces via an integrated feed. In some examples, the data can be organized and/or is sortable by workspace, time (e.g., when associated data is posted or an associated operation is otherwise performed), type of action, channel, user, or the like. In some examples, such data can be associated with an indication of which user (e.g., member of the channel) posted the message and/or performed an action. In examples where the third section 150 presents data associated with multiple workspaces, at least some data can be associated with an indication of which workspace the data is associated with. In some examples, the third section 150 may present data associated with an item selected from the second section 148, such as a channel, document, or direct message. Additional details associated with the user interface 144, and the third region 150, are described below with reference to FIG. 2.

In at least one example, the operating system 142 can manage the processor(s) 132, computer-readable media 134, hardware, software, etc. of the user computing device(s) 104.

The communication interface(s) 136 can include one or more interfaces and hardware components for enabling communication with various other devices (e.g., the user computing device(s) 104), such as over the network(s) 106 or directly. In some examples, the communication interface(s) 136 can facilitate communication via Web Sockets, APIs (e.g., using API calls), HTTPs, etc.

The user computing device(s) 104 can further be equipped with various input/output devices 138 (e.g., I/O devices). Such I/O devices 138 can include a display, various user interface controls (e.g., buttons, joystick, keyboard, mouse, touch screen, etc.), audio speakers, microphones, cameras, connection ports and so forth.

While techniques described herein are described as being performed by the documents manager 116, the VS management component 118, the application 140, and/or the documents application, techniques described herein can be performed by any other component, or combination of components, which can be associated with the server(s) 102, the user computing device(s) 104, or a combination thereof.

Figure 2:
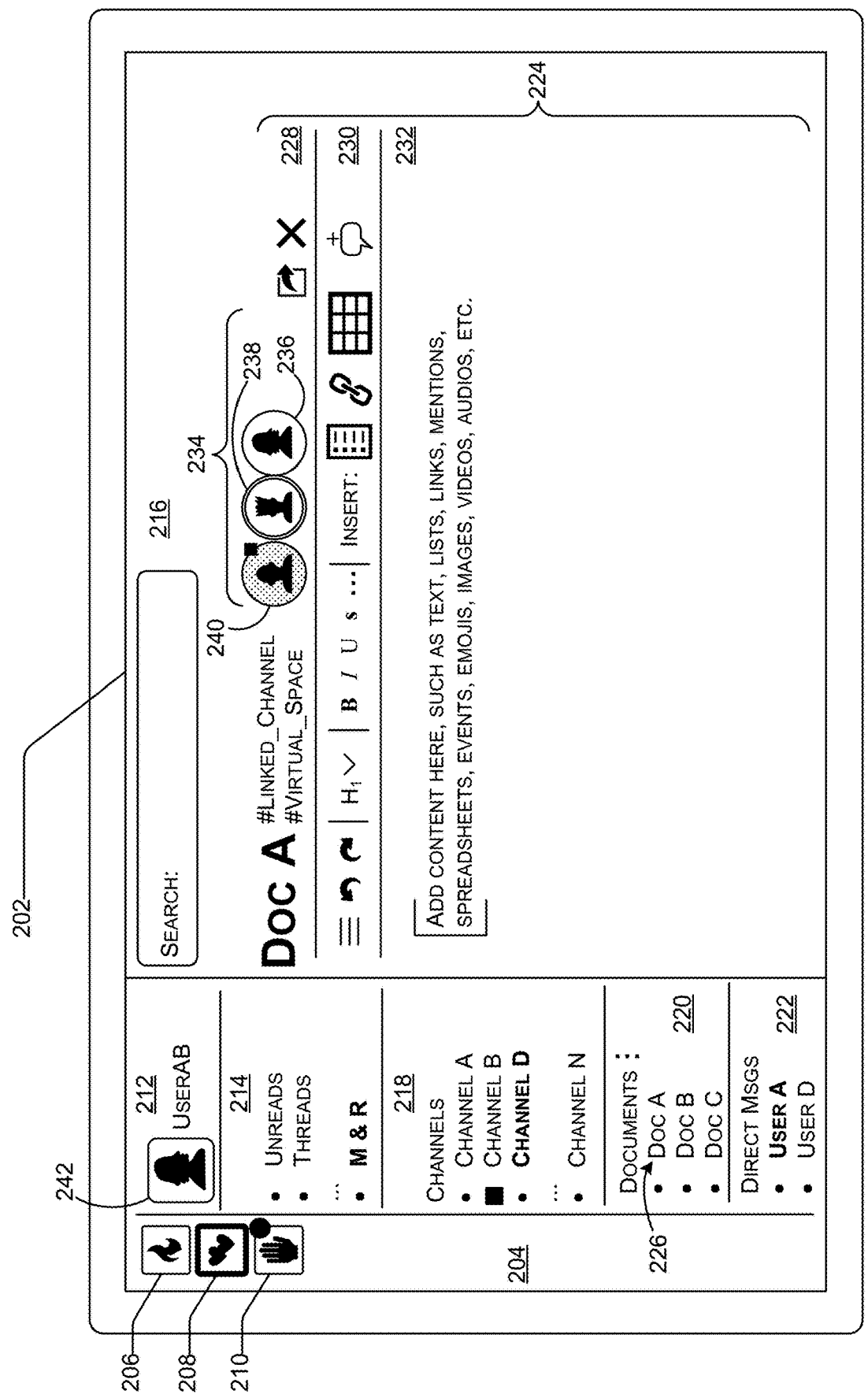
FIG. 2 illustrates an example user interface associated with a communication platform, as described herein, wherein a documents interface for presenting presence information via the user interface.

Referring to FIG. 2, FIG. 2 illustrates a user interface 202, which may be similar to (or associated with), the user interface 144 described with respect to FIG. 1. As described above, in at least one example, the user interface 144 can include a first region 204 (or pane, section, etc.) that includes indicator(s) (e.g., user interface element(s) or object(s)) of workspace(s) with which the user (e.g., account of the user) is associated. As illustrated in FIG. 2, the user (e.g., UserAB) can be associated with three different workspaces. In some examples, the workspaces can be associated with a same organization (e.g., associated with a same organization identifier). In some examples, one or more of the workspaces can be associated with different organizations (e.g., associated with different organization identifiers). In some examples, one of the workspaces can be associated with users from a single organization (e.g., associated with a same organization identifier) and another of the workspaces can be associated with users from two or more different organizations (e.g., associated with different organization identifiers).

In at least one example, each workspace can be associated with a different indicator 206, 208, and 210, presented via the first region 204. In at least one example, a user account of the user (e.g., UserAB) can be associated with group identifiers that correspond to each of the workspaces (e.g., as determined by the user data 124 and/or the workspace data 128). As such, the user account of the user can be associated with each of the workspaces. A first indicator 206 can represent a first workspace, a second indicator 208 can represent a second workspace, and a third indicator 210 can represent a third workspace.

In some examples, the user can navigate between the workspaces by actuating a control associated with each of the indicators 206, 208, and 210 without needing to log out of one workspace and log in to each of the other workspaces. Non-limiting examples of such indicators, or any indictors described herein, can include icons, symbols, links, tabs, or other user interface elements or objects. In some examples, such indicators can be associated with actuation mechanisms to enable a user to select an indicator and transition to another workspace. In some examples, a visual indicator can indicate which workspace a user is currently interacting with and/or most recently interacted with. For example, the second indicator 208 is outlined in a heavier weight than the first indicator 206 and the third indicator 210, thereby indicating which workspace the user is currently interacting with and/or most recently interacted with. In some examples, the indicators 206, 208, and 210 can be associated with another indicator indicating that the corresponding workspace has been updated. An example is shown with respect to the third indicator 210.

While three indicators 206, 208, and 210 are illustrated in FIG. 2, the user can be associated with any number of workspaces. In some examples, indicators associated with all of the workspaces with which a user is associated can be presented via the first region 204. In some examples, some of the indicators associated with all of the workspaces with which a user is associated can be presented via the first region 204 and the user can interact with the user interface 202 to view additional or alternative indicators. In examples where fewer than all workspaces are represented via the user interface 202, the indicators can be arranged in alphabetical order, in an order of most recent interaction, in an order based on most frequent interaction, or some other order.

In some examples, the first region 204 may not be included in the user interface 202, and such information can be integrated into the user interface 202 via additional or alternative mechanisms.

In some examples, the user interface 202 can include a second section 212, or pane, that includes indicator(s) (e.g., user interface element(s) or object(s)) representing virtual space(s) associated with the workspace(s) with which the user (e.g., account of the user) is associated. In at least one example, the second region 212 can include one or more sub-sections, or sub-panes, which can represent different virtual spaces. For example, a first sub-section 214 can include indicators representing virtual spaces that can aggregate data associated with a plurality of communication channels and/or workspaces. In at least one example, each virtual space can be associated with an indicator in the first sub-section 214. In some examples, an indicator can be associated with an actuation mechanism such that when actuated (e.g., selected), can cause the application 140 to present data associated with the corresponding virtual space via a third region 216. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the third section 216, for example in a feed. In such examples, different types of events and/or actions, which can be associated with different communication channels and/or virtual spaces, can be presented via a same feed. In some examples, such data can be organized and/or is sortable by workspace, time, type of action, communication channel, user, or the like. In some examples, such data can be associated with an indication of which user (e.g., member of the communication channel) posted the message and/or performed an action.

In some examples, each virtual space can be associated with a same type of event and/or action. For example, "threads" can be associated with messages, files, etc. posted in threads to messages posted in a communication channel and "mentions and reactions" (e.g., "M & R") can be associated with messages or threads where the user (e.g., UserAB) has been mentioned (e.g., via a tag) or another user has reacted (e.g., via an emoji, reaction, or the like) to a message or thread posted by the user. That is, in some examples, same types of events and/or actions, which can be associated with different communication channels and/or virtual spaces, can be presented via a same feed. As with the "unreads" virtual space, data associated with such virtual spaces can be organized and/or is sortable by workspace, time, type of action, communication channel, user, or the like.

In at least one example, the second portion 212 of the user interface 202 can include a second sub-section 218, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the second sub-section 218 can depict all communication channels, or a subset of all communication channels, that the user has permission to access (e.g., as determined by the permission data 126). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second sub-section 218 can depict all communication channels, or a subset of all communication channels, that the user is a member of, and the user can interact with the user interface 202 to browse or view other communication channels that the user is not a member of but are not currently displayed in the second sub-section 218. In some examples, different types of communication channels (e.g., public, private, shared, cross-workspace, etc.) can be in different sections of the second sub-section 218, or can have their own sub-regions or sub-panes in the user interface 202. In some examples, communication channels associated with different workspaces can be in different sections of the second sub-section 218, or can have their own regions or panes in the user interface 202.

In some examples, the indicators can be associated with graphical elements that visually differentiate types of communication channels. For example, Channel B is associated with a square visual element instead of a circle visual element. As a non-limiting example, and for the purpose of this discussion, the square visual element can indicate that the user is not a current member of Channel B, whereas the circle visual element can indicate that the user is a current member of Channels A, D, and N. In some examples, additional or alternative graphical elements can be used to differentiate between public communication channels, private communication channels, shared communication channels, communication channels associated with different workspaces, and the like. In other examples, communication channels that the user is not a current member of may not be displayed in the second sub-section 218 of the user interface 202.

In addition, the second section 212 can include a third sub-section 220, or sub-pane, that can include indicators representative of documents. In some examples, the documents can include public documents (e.g., discoverable by all users associated with a workspace), private documents (e.g., discoverable by only some users associated with a workspace), shared documents (e.g., between groups or organizations), etc. In some examples, the documents represented can be associated with a single workspace. In some examples, the documents represented can be associated with different workspaces (e.g., cross-workspace). In at least one example, if a document is cross-workspace (e.g., associated with different workspaces), the user may be associated with both workspaces or may only be associated with one of the workspaces. In some examples, the documents represented can be associated with (e.g., linked to) combinations of communication channels associated with a single workspace and communication channels associated with different workspaces.

In some examples, the third sub-section 220 can depict all documents, or a subset of all documents, that the user has permission to access (e.g., as determined by the permission data 126 or documents data). In such examples, the documents can be arranged alphabetically, based on most recent interaction (e.g., creating, viewing, editing, commenting, sharing, etc.), based on frequency of interactions, based on document type (e.g., public, private, shared, cross-workspace, etc.), based on workspace, in user-designated sections, or the like. In some examples, the third sub-section 220 can depict all documents, or a subset of all documents, associated with all virtual spaces that the user is a member of, and the user can interact with the user interface 202 to browse or view documents linked to other virtual spaces that the user is not a member of but are not currently displayed in the second sub-section 220 (e.g., by selecting "browse" in element 154). In some examples, different types of documents (e.g., public, private, shared, cross-workspace, etc.) can be in different sections of the third sub-section 220, or can have their own sub-regions or sub-panes in the user interface 202. In some examples, documents associated with different workspaces can be in different sections of the third sub-section 220, or can have their own section or panes in the user interface 202.

In addition, the second section 212 can include a fourth sub-section 222, or sub-pane, that can include indicators representative of communications with individual users or multiple specified users (e.g., instead of all, or a subset of, members of an organization). Such communications can be referred to as "direct messages." That is, the fourth sub-section 222, or sub-pane, can include indicators representative of virtual spaces that are associated with private messages between one or more users.

In examples, various information can be presented in the third section 216. In some examples, a document interface 224 can be presented in the third section 216, such as in response to selection of a documents indicator 226 in the third sub-section 220. The documents interface 224 may include various interface elements, such as a header section 228, an editing tools section 230, and a content section 232. Each of these sections may include various interface elements. For example, the header section 228 may include a document title (e.g., "Doc A"), a list of one or more linked virtual spaces (e.g., "#Linked Channel" and "#Virtual Space"), a presence indicator(s) section 234, a share interface element, and a close interface element.

As indicated in other portions of this disclosure, the presence indicator(s) section 234 may present one or more presence indicators representing one or more user accounts presently interacting with the document (e.g., Doc A) rendered in the documents interface 224. For example, a first instance of the Doc A may be presently open on a first user computing device of UserAB, and a second instance of Doc A may be presently open on a second user computing device of a second user account. As such, examples of this disclosure can present, in one or more various sections of the documents interface 224 (e.g., which is presenting Doc A), a presence indicator 236 indicating the presence of UserAB and one or more other presence indicators 238 and 240 that indicate that other user accounts are presently interacting with respective instances of Doc A.

In some examples, presence indicators rendered in the presence indicator(s) section 234 may be organized in various manners. For example, presence indicators associated with user accounts most actively interacting with the document may be presented first (e.g., by sorting) or otherwise more prominently. In some examples, presence indicators associated with user accounts having higher preference status (e.g., starred or favorited) may be presented first or otherwise more prominently. In some examples, presence indicators may be stacked in an overlapping fashion. In some examples, presence indicators may be grouped by one or more various criteria, such as virtual-space membership, permissions levels, level of interaction with the document, and the like.

In some examples, a presence indicator may have attributes (e.g., appearance attributes) that indicate information about a respective user, such as, but not limited to, a permission level (e.g., edit permissions, read-only access, etc.), virtual-space membership (e.g., whether the member belongs to a virtual space associated with the document, such as #Linked Channel and/or #Virtual Space), and the manner in which the user is interacting with the document (e.g., currently editing, viewing, open but not active, etc.). For example, the presence indicator 240 includes an attribute comprising a colored square, which can indicate the user account associated with the presence indicator 240 has not joined a channel (or other virtual space) associated with the document. In addition, the presence indicator 240 is shaded (e.g., relative to the other indicators 236 and 238), which may indicate that the user account associate with the presence indicator 240 may have different permissions (e.g., read only) than the user accounts associated with the presence indicators 236 and 238. As another example, the presence indicator 238 includes a double circle, which may indicate the user account associated with the presence indicator 238 is presently editing an instance of Doc A (e.g., a single circle, such as presented with the presence indicator 236, may indicate the user account is presently viewing the document and not actively editing, tying, etc.). In addition, in some examples, a presence indicator (e.g., 236, 238, and 240) may have attributes (e.g., circular avatar frame) that are different from other types of user interface elements (e.g., other concurrently presented indicators) that may also convey status information about a user (e.g., user profile indicator 242 having a square avatar frame), which can help to more clearly differentiate between user-status information associated with the presence indicator and user-status information associated with a different indicator. Among other things, the presence indicator described in examples of this disclosure can improve collaboration (e.g., via simultaneous interaction) when multiple users are interacting with respective instances of the same document. For example, a user can more quickly determine who else is already interacting with the document (e.g., by glancing at the presence indicator(s) section 234) without needing to send separate messages and/or can more quickly determine whether to send the document, or a link to the document, to another user (e.g., based on a lack of presence indicator). In addition, the presence indicators can provide an indication of the present status of the document without a user needing to separately message other users to determine a status (e.g., many presence indicators indicating multiple users can suggest the document is being presently viewed and/or edited).

In some examples, in addition to or in the alternative to a presence indicator identifying a particular individual interacting with or associated with a document, a presence indicator can indicate which particular organization a user is associated with. For example, a first presence indicator can indicate an identity of a user as well as a first organization associated with the user and a second presence indicator can indicate an identity of the first organization without specifically identifying the identity of the user. Various presence indicators can further identify permissions and/or identities, as discussed herein.

Figure 3:
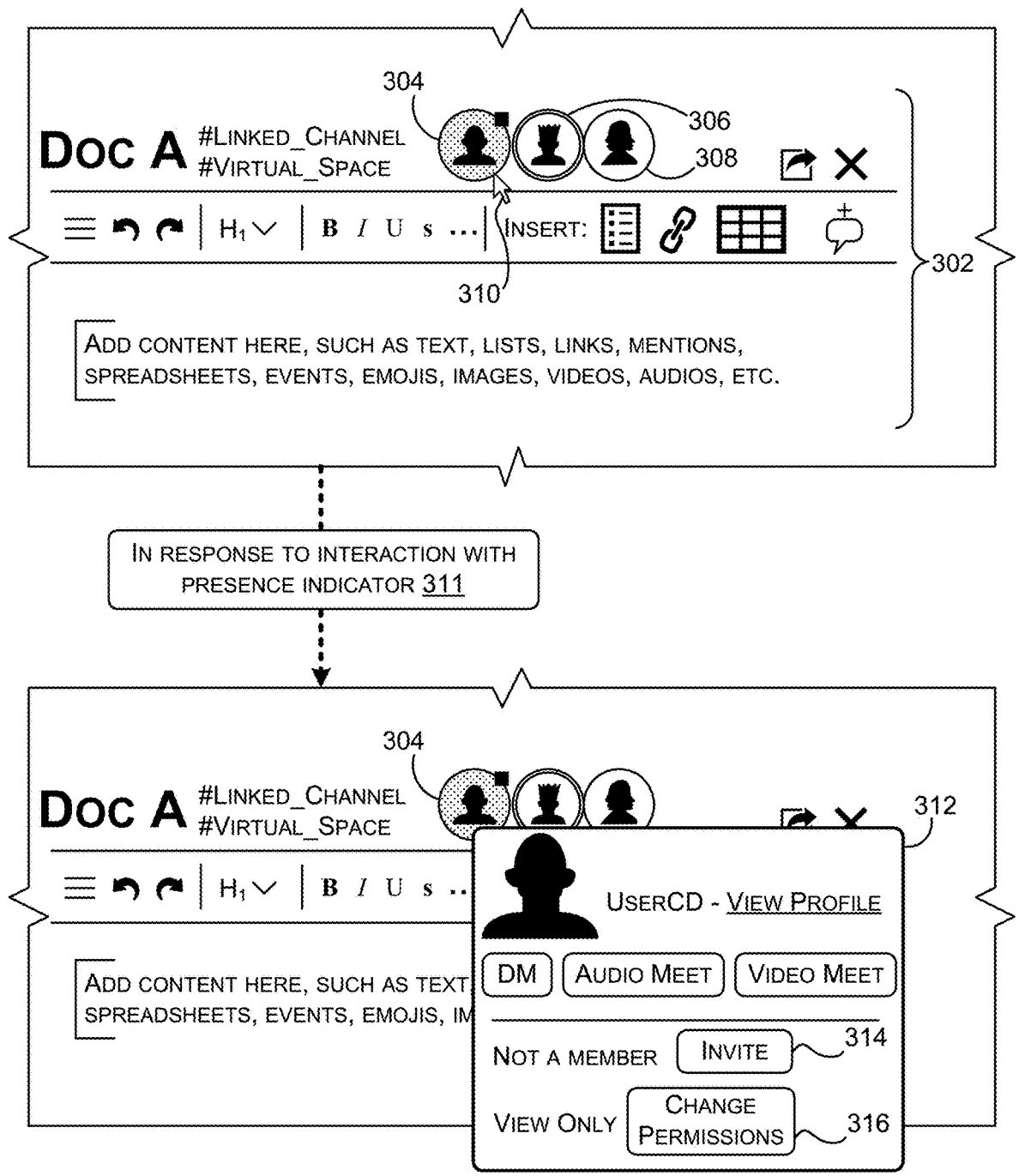
FIG. 3 illustrates example user interfaces associated with a communications platform, as described herein, wherein a presence indicator can present additional information associated with a user account and enable actions to be taken with respect to a user account.

In examples of the present disclosure, a presence indicator may be used, by a first user, to take one or more actions with respect to a second user. Referring to FIG. 3, FIG. 3 shows an example documents interface 302 (e.g., similar to the documents interface 224 but shown separately from a larger interface, such as 202), including presence indicators 304, 306, and 308. In some examples of the present disclosure, interacting with a presence indicator may trigger a presentation of additional information associated with a respective user account. For example, hovering or selecting a presence indicator may invoke an overlay or pop-up interface element that presents additional information associated with the user account. Additional information may include, but not be limited to, general information (e.g., name, position in organization, link to profile, etc.), as well as document specific information (e.g., permissions, virtual-space membership, etc.). For instance, referring to FIG. 3, the cursor arrow 310 indicates an interaction (e.g., hover, selection, etc.) with the presence indicator 304, and in some examples, an interaction may still occur without needing an arrow to be presented.

In some examples, presence indicators can be displayed or otherwise presented in instances where the document is opened outside of the group-based communication system. In such an example, a program opening the document may send request to a server associated with the group-based communication system for permissions information and/or information indicative of users associated with a document. In some examples, if a document is opened outside the group-based communication system, an identity of the user can be sent to a server associated with the group-based communication system to updated presence information in other instances of the document. In some examples, such information can be stored as metadata associated with the document, which may obviate a request for information indicative of the presence information. In some examples, the presence information can be stored as metadata and reconciled with information stored in association with the group-based communication system.

FIG. 3 illustrates that, in some examples, in response to the interaction, an interface element 312 may be presented with additional information. In some examples, the additional information may include information associated with the user account (e.g., UserCD) and with the document. For example, the additional information may indicate whether the user account is a member of a virtual space associated with the document (e.g., #Linked Channel and/or #Virtual Space in FIG. 3). In some examples, the additional information may indicate what permissions (e.g., view only, editor, etc.) are associated with the user account as it relates to the document.

In some examples, a user can invite, based on presence information, users to a collaborative meeting, such as an audio-based synchronous meeting. For examples, the user can select an indicator to start a meeting and invite some or all of users currently interacting with a document (or users that are otherwise associated with the document) to a meeting, such as an audio or video call.

In some examples, when a user account is not a member of a virtual space associated with the document (e.g., "not a member" in FIG. 3), then examples of the present disclosure may present, in association with the interface element 312, an affordance 314 that, when selected, invites the user account to join the virtual space. That is, in some examples, an invitation for a user account to join a channel can be provided in response to selection or interaction with an affordance. In at least some examples, the interface element 312 may present a permissions affordance 316 that, when selected, allows permissions to be specified for the user account (e.g., UserCD in FIG. 3). As such, examples of the present disclosure improve collaboration by improving information access and sharing while the collaboration is occurring (e.g., while a user is interacting with a document). For example, referring to FIG. 3, one can determine, based on the presence indicator 304, that UserCD is interacting with the document and may have limited access to some information (e.g., associated with the virtual space and/or the document). As such, by way of the affordances 314 and 316, changes can be quickly made to increase the access and collaborative opportunities associated with UserCD. In some examples, the interface element 312 and/or affordances 314 and/or 316 can be presented or otherwise displayed at least partially in response to an interaction with the presence indicator 304, as illustrated by the operation 311.

Figure 4:
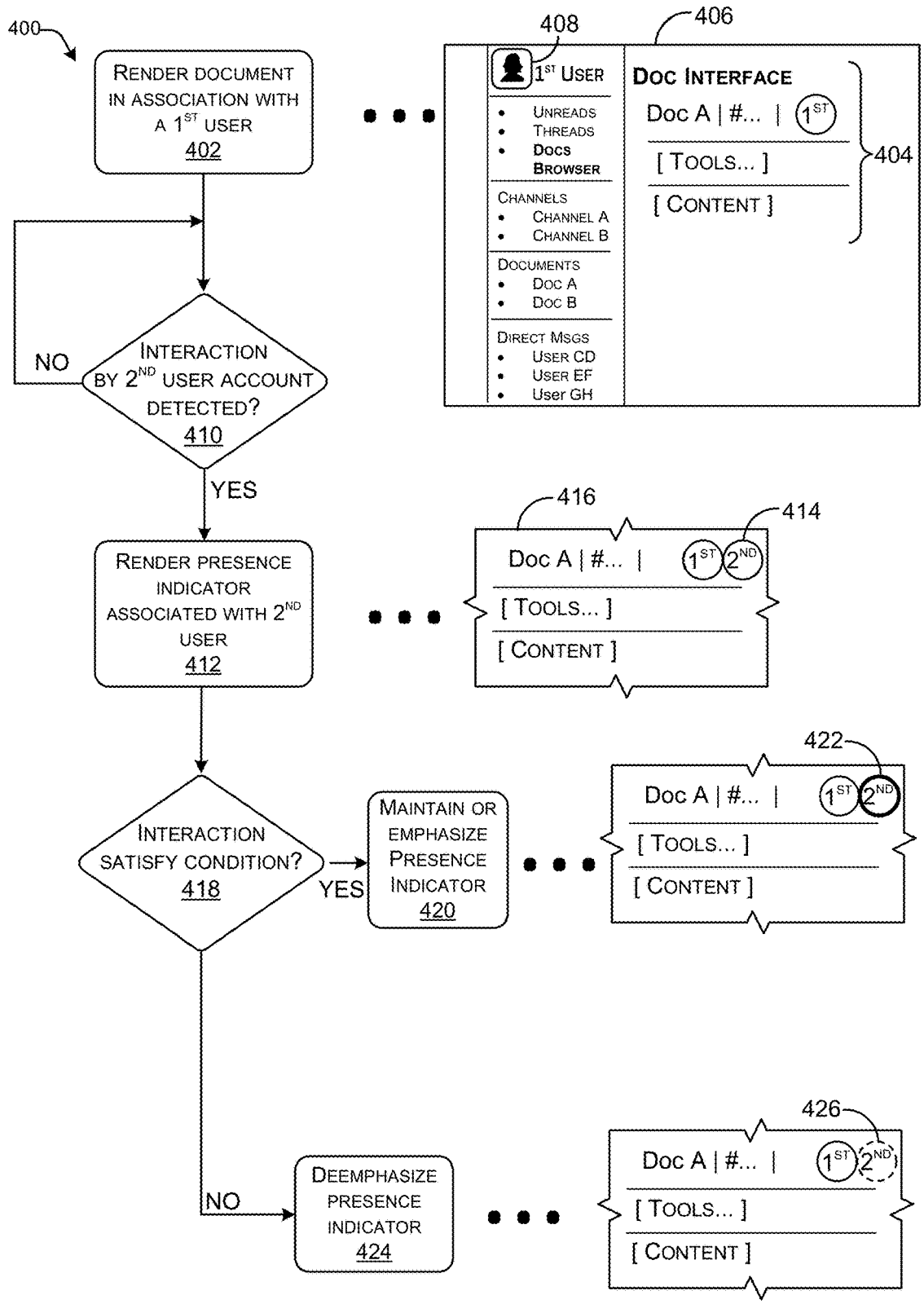
FIG. 4 illustrates an example process for presenting a presence indicator, as described herein.

Referring to FIG. 4, an example process 400 is illustrated for providing a presence indicator. In some instances, some or all of process 400 may be performed by one or more components in the environment 100 or one or more components discussed with respect to FIGS. 2 and/or 3. However, the process 400 is not limited to being performed by components in the environment 100, and the components in the environment 100 are not limited to performing the processes 400. In addition, example user interfaces are also provided in FIG. 4 to help illustrate elements, and the process 400 is not limited to the aspects shown in the user interfaces.

Referring to FIG. 4, in at least some examples, at operation 402, the process 400 includes rendering, for display via a client and in association with a first user account of a communications platform, a first instance of a document. For example, in FIG. 4, a first instance of a document tilted "Doc A" is presented in a documents interface second 404, which may include a section or pane of a larger interface 406 of a communications platform and presented via a client. In addition, the larger interface 406 includes an interface element 408 indicating an association with a first user account (e.g., "1$^{st}$ User").

In some examples, at operation 410, the process 400 includes determining whether an interaction by a second user account with the document (or another instance of the document) has been detected. If an interaction is detected (or if a level of interaction meets or exceeds a threshold level of interaction), then the process 400 may proceed to operation 412. An interaction may be detected in various manners. In one example, detecting an interaction may include receiving an indication that a second user account of the communications platform is presently interacting with a second instance of the document or has done so within a threshold amount of time. For example, the client (e.g., in FIG. 1, the communication application 140, the documents application 143, and/or the user computing device 104a) associated with the first user account and the first instance of the document may send a communication to one or more server(s) (e.g., the server(s) 102 and/or the documents manager 116) requesting or querying whether any interaction has been detected. And in response to the communication, the server(s) may provide, and the client may receive, the indication that the second user account of the communications platform is presently interacting with the second instance of the document. In some examples, the server(s) may push notifications indicating when an interaction is detected. For example, when the first instance of the document is opened via the client, the client may subscribe to updates associated with the document, such as updates indicating another user is interacting with the document (or another instance of the document). If the interaction is not detected, or a threshold level of activity is not detected (e.g., the "NO" path connected to operation 410), then the process 400 may repeat the determination operation 410 after a time duration elapses (e.g., 60 seconds). For example, the client may query the server(s) every 60 seconds (or some other schedule) to determine whether any additional interaction is has been detected.

In some examples, at operation 412, the process 400 includes rendering, for display via the client and in association with the first instance of the document, a presence indicator that is associated with the second user account and that indicates the second user account is presently interacting with the second instance of the document. For example, in FIG. 4, a presence indicator 414 is depicted (in association with a truncated portion 416 of the interface) indicating a second user account is presently interacting with Doc A (e.g., opening, viewing, editing, commenting, etc.).

In at least some examples, at operation 418, the process 400 includes determining whether an interaction of the second user account with the document satisfies a condition. One or more various conditions may be considered as part of the operation 418. For example, a condition may consider a nature or quality of the interaction of the second user account with the document, such as whether the second user account is (or has most recently within a threshold time) scrolling, editing, commenting, or otherwise providing input(s) to the documents interface. In some examples, a condition may include whether the document is open and in a foreground and/or not obscured from view (e.g., in a background, minimized, etc.). In some examples, the operation 418 can be determined with respect to a threshold level of activity or satisfaction of the condition. If "YES," then the process 400 proceeds to operation 420, which includes maintaining and/or emphasizing the presence indicator. For example, as illustrated by the presence indicator 422, a frame around the presence indicator may be modified, such as by bolding, changing color, or otherwise. In some examples, the presence indicator may be emphasized (relative to others) by presenting the presence indicator at or near the first of a group of presence indicators. If the condition is not satisfied (e.g., "NO" path associated with 418), then the process 400 may include, at operation 424, deemphasizing the presence indicator or otherwise decreasing a prominence of the presentation (relative to other presence indicators, as a relative prominence). For example, as illustrated by the presence indicator 426, a frame of the presence indicator can be modified (e.g., dashed, reduced line weight, color change, etc.) to deemphasize the presence indicator. In some examples, a relative transparency of the presence indicator may be increased, or a size decreased, in order to deemphasis the presence indicator. In some examples, a location of the presence indicator, motion or animation of the presence indicator may correspond to a level of interaction associated with an object, a type of interaction, permission(s) associated with a user account, and the like.

The operations described with respect to the process 400 provide one or more examples of the present disclosure. In some examples, all of the operations may not be performed.

For example, in some instances, the process 400 may include only operations 402, 410, and 412.

Example Clauses

A. A method comprising: rendering, for display via a client and in association with a first user account of a communication platform, a first instance of a document; receiving an indication that a second user account of the communication platform is presently interacting with a second instance of the document; and rendering, for display via the client and in association with the first instance of the document, a presence indicator that is associated with the second user account and that indicates the second user account is presently interacting with the second instance of the document.

B: The method of paragraph A, wherein the presence indicator includes one or more attributes indicating the second user account is one or more of viewing, editing, or commenting on, the second instance of the document.

C: The method of paragraph A or B, wherein the presence indicator is indicative of an organization associated with the second user account.

D: The method of paragraph C, wherein the presence indicator is a first presence indicator of a first an organization, and wherein the method further comprises: rendering, for display via the client, a second presence indicator that indicates that the first user account is presently interacting with the first instance of the document, wherein the second presence indicator is indicative of a second organization that is different than the first organization.

E: The method of any of paragraphs A-D, wherein: the document is associated with a virtual space; and the method further comprises: presenting, based on an interaction via the client with the presence indicator, an affordance; and providing, in response to a selection of the affordance, an invitation for the second user account to join the virtual space.

F: The method of any of paragraphs A-E, wherein: the method further comprises presenting, based on an interaction via the client with the presence indicator, an affordance; and selecting the affordance modifies a permissions level associated with the second user account and the document.

G: The method of any of paragraphs A-F, further comprising: receiving an indication that an interaction of the second user account with the second instance of the document satisfies a condition; and modifying, based on the interaction satisfying the condition, a presentation of the presence indicator.

H: The method of paragraph G, wherein: the condition includes a threshold level of interaction with the second instance of the document; and modifying the presentation includes increasing a relative prominence of the presentation of the presence indicator among one or more other presence indicators.

I: The method of paragraph G or H, wherein: the condition includes one or more of the second instance of the document being at least partially obscured from view or expiration of a time duration without interaction with the second instance of the document; and modifying the presentation includes decreasing a relative prominence of the presence indicator among one or more other presence indicators.

J. A system comprising: one or more processors; and one or more non-transitory computer-readable media storing instructions that, when executed, cause the system to: render, for display via a client and in association with a first user account of a communication platform, a first instance of a document; receive an indication that a second user account of the communication platform is presently interacting with a second instance of the document; and render, for display via the client and in association with the first instance of the document, a presence indicator that is associated with the second user account and that indicates the second user account is presently interacting with the second instance of the document.

K: The system of paragraph J, wherein the presence indicator includes one or more attributes indicating the second user account is one or more of viewing, editing, or commenting on, the second instance of the document.

L: The system of paragraph J or K, wherein the presence indicator is indicative of an organization associated with the second user account.

M: The system of paragraph L, wherein the presence indicator is a first presence indicator of a first an organization, and wherein the instructions further cause the system to: render, for display via the client, a second presence indicator that indicates that the first user account is presently interacting with the first instance of the document, wherein the second presence indicator is indicative of a second organization that is different than the first organization.

N: The system of any of paragraphs J-M, wherein: the document is associated with a virtual space; and wherein the instructions further cause the system to: present, based on an interaction via the client with the presence indicator, an affordance; and provide, in response to a selection of the affordance, an invitation for the second user account to join the virtual space.

O: The system of any of paragraphs J-N, wherein: wherein the instructions further cause the system to present, based on an interaction via the client with the presence indicator, an affordance; and selecting the affordance modifies a permissions level associated with the second user account and the document.

P: The system of any of paragraphs J-O, wherein the instructions further cause the system to: receive an indication that an interaction of the second user account with the second instance of the document satisfies a condition; and modify, based on the interaction satisfying the condition, a presentation of the presence indicator.

Q. One or more non-transitory computer-readable media storing instructions that, when executed, cause one or more processors to: render, for display via a client and in association with a first user account of a communication platform, a first instance of a document; receive an indication that a second user account of the communication platform is presently interacting with a second instance of the document; and render, for display via the client and in association with the first instance of the document, a presence indicator that is associated with the second user account and that indicates the second user account is presently interacting with the second instance of the document.

R: The one or more non-transitory computer-readable media of paragraph Q, wherein the presence indicator includes one or more attributes indicating the second user account is one or more of viewing, editing, or commenting on, the second instance of the document.

S: The one or more non-transitory computer-readable media of paragraph Q or R, wherein the presence indicator is indicative of an organization associated with the second user account.

T: The one or more non-transitory computer-readable media of any of paragraphs Q-S, wherein: the document is associated with a virtual space; and wherein the instructions further cause the one or more processors to: present, based on an interaction via the client with the presence indicator, an affordance; and provide, in response to a selection of the affordance, an invitation for the second user account to join the virtual space.

U: The one or more non-transitory computer-readable media of any of paragraphs Q-T, wherein: wherein the instructions further cause the one or more processors to present, based on an interaction via the client with the presence indicator, an affordance; and selecting the affordance modifies a permissions level associated with the second user account and the document.

V: The one or more non-transitory computer-readable media of any of paragraphs Q-U, wherein the instructions further cause the one or more processors to: receive an indication that an interaction of the second user account with the second instance of the document satisfies a condition; and modify, based on the interaction satisfying the condition, a presentation of the presence indicator.

While the example clauses described above are described with respect to one particular implementation, it should be understood that, in the context of this document, the content of the example clauses can also be implemented via a method, device, system, a computer-readable medium, and/ or another implementation. Additionally, any of examples A-V may be implemented alone or in combination with any other one or more of the examples A-V.

What is claimed is:

1. A method comprising:
   rendering, for display via a client and in association with a first user account of a communication platform, a first instance of a document comprising a first presence indicator that designates the first user account, wherein the first presence indicator is displayed with a first attribute indicating a first permission level to edit the document;
   receiving an indication that a second user account of the communication platform is presently interacting with a second instance of the document;
   rendering, for display via the client and in association with the first instance of the document, a second presence indicator that designates the second user account and that indicates the second user account is presently interacting with the second instance of the document, wherein the second presence indicator is displayed with a second attribute different than the first attribute, the second attribute indicating a second permission level to edit the document;
   receiving an indication of an interaction with the second presence indicator; and
   modifying, based at least in part on the interaction with the second presence indicator, the second permission level and the second presence indicator.

2. The method of claim 1, wherein the second presence indicator includes a third attribute indicating the second user account is one or more of viewing, editing, or commenting on, the second instance of the document.

3. The method of claim 1, wherein the second presence indicator is indicative of an organization associated with the second user account.

4. The method of claim 3, wherein the first presence indicator is indicative of the first user account being associated with a first organization, and
   wherein the second presence indicator is indicative of the second user account being associated with a second organization that is different than the first organization.

5. The method of claim 1, wherein:
   the document is associated with a virtual space; and
   the method further comprises:
      presenting, based on an interaction via the client with the second presence indicator, an affordance; and
      providing, in response to a selection of the affordance, an invitation for the second user account to join the virtual space.

6. The method of claim 1, further comprising:
   receiving an indication that an interaction of the second user account with the second instance of the document satisfies a condition; and
   modifying, based on the interaction satisfying the condition, a presentation of the second presence indicator.

7. A system comprising:
   one or more processors; and
   one or more non-transitory computer-readable media storing instructions that, when executed, cause the system to:
      render, for display via a client and in association with a first user account of a communication platform, a first instance of a document comprising a first presence indicator that designates the first user account, wherein the first presence indicator is displayed with a first attribute indicating a first permission level to edit the document;
      receive an indication that a second user account of the communication platform is presently interacting with a second instance of the document;
      render, for display via the client and in association with the first instance of the document, a second presence indicator that designates the second user account and that indicates the second user account is presently interacting with the second instance of the document, wherein the second presence indicator is displayed with a second attribute different than the first attribute, the second attribute indicating a second permission level to edit the document;
      receive an indication of an interaction with the second presence indicator; and
      modify, based at least in part on the interaction with the second presence indicator, the second permission level and the second presence indicator.

8. The system of claim 7, wherein the second presence indicator is indicative of an organization associated with the second user account.

9. The system of claim 8, wherein the first presence indicator is indicative of the first user account being associated with a first organization, and
   wherein the second presence indicator is indicative of the second user account being associated with a second organization that is different than the first organization.

10. The system of claim 7, wherein:
    the document is associated with a virtual space; and
    wherein the instructions further cause the system to:
       present, based on an interaction via the client with the second presence indicator, an affordance; and
       provide, in response to a selection of the affordance, an invitation for the second user account to join the virtual space.

11. The system of claim 7, wherein the instructions further cause the system to:
    receive an indication that an interaction of the second user account with the second instance of the document satisfies a condition; and
    modify, based on the interaction satisfying the condition, a presentation of the second presence indicator.

12. One or more non-transitory computer-readable media storing instructions that, when executed, cause one or more processors to:
    render, for display via a client and in association with a first user account of a communication platform, a first instance of a document comprising a first presence indicator that designates the first user account, wherein the first presence indicator is displayed with a first attribute indicating a first permission level to edit the document;
    receive an indication that a second user account of the communication platform is presently interacting with a second instance of the document;
    render, for display via the client and in association with the first instance of the document, a second presence indicator that designates the second user account and that indicates the second user account is presently interacting with the second instance of the document, wherein the second presence indicator is displayed a second attribute different than the first attribute, the second attribute indicating a second permission level to edit the document;
    receive an indication of an interaction with the second presence indicator; and
    modify, based at least in part on the interaction with the second presence indicator, the second permission level and the second presence indicator.

13. The one or more non-transitory computer-readable media of claim 12, wherein the second presence indicator includes one or more attributes-a third attribute indicating the second user account is one or more of viewing, editing, or commenting on, the second instance of the document.

14. The one or more non-transitory computer-readable media of claim 12, wherein the second presence indicator is indicative of an organization associated with the second user account.

15. The one or more non-transitory computer-readable media of claim 12, wherein:
    the document is associated with a virtual space; and
    wherein the instructions further cause the one or more processors to:
        present, based on an interaction via the client with the second presence indicator, an affordance; and
        provide, in response to a selection of the affordance, an invitation for the second user account to join the virtual space.

16. The one or more non-transitory computer-readable media of claim 12, wherein the instructions further cause the one or more processors to:
    receive an indication that an interaction of the second user account with the second instance of the document satisfies a condition; and
    modify, based on the interaction satisfying the condition, a presentation of the second presence indicator.

17. The method of claim 1, wherein presence indicators designating user accounts are configured to be sorted and presented based at least in part on a level of interaction with the document.

18. The method of claim 1, wherein:
    the document is associated with a virtual space, and the second presence indicator associated with the second user account further indicates that the second user account is not a member of the virtual space.

19. The method of claim 1, wherein:
    the document is associated with a virtual space, and
    presence indicators designating user accounts are configured to be sorted and presented based at least in part on a membership to the virtual space.

20. The method of claim 1, wherein the first attribute comprises a first shape, a first pattern, or a first color, and the second attribute comprises a second shape, a second color, or a second pattern.

* * * * *